United States Patent [19]

Storey et al.

[11] Patent Number: 5,219,948

[45] Date of Patent: Jun. 15, 1993

[54] PROCESS FOR CATIONIC POLYMERIZATIONS

[75] Inventors: Robson F. Storey, Hattiesburg, Miss.; Youngkwan Lee, Gainesville, Fla.; Bret J. Chisholm, Hattiesburg, Miss.

[73] Assignee: University of Southern Mississippi, Hattiesburg, Miss.

[21] Appl. No.: 839,861

[22] Filed: Feb. 21, 1992

[51] Int. Cl.⁵ .............. C08F 293/00; C08L 53/00
[52] U.S. Cl. .......................... 525/314; 525/249; 525/259; 525/267; 525/268; 525/269; 525/270; 525/272; 525/315; 525/316; 525/319
[58] Field of Search .......... 525/259, 267, 314, 315, 525/319, 272, 270, 268, 269, 245, 316

[56] References Cited

U.S. PATENT DOCUMENTS 5,066,730 11/1991 Kennedy et al. .

Primary Examiner—Jacob Ziegler
Attorney, Agent, or Firm—Keith M. Tackett

[57] ABSTRACT

Elastomeric polymers comprising polymerized alpha-olefins or conjugated alkadienes are produced by cationic polymerization in the presence of titanium tetrachloride and an electron pair donor selected from pyridine or a non-hindered alkylpyridine. The polymers have very narrow, mono-modal molecular weight distributions such a achived by anionic polymerization. Polymerization of each monomer is terminated prior to broadening of the molecular weight distribution which significantly detracts from polymer properties.

18 Claims, No Drawings

PROCESS FOR CATIONIC POLYMERIZATIONS

FIELD OF THE INVENTION

This invention relates to cationic polymerization of elastomeric polymers. More particularly, the invention relates to such polymerization processes which employ complexes of Lewis acids and electron pair donors to control the polymerization.

BACKGROUND OF THE INVENTION

Elastomeric homopolymers and copolymers of more than one monomer are well known in the art. A particularly useful class of synthetic elastomers comprises adjacent blocks of a polymerized elastomer such as a conjugated alkadiene and a polymerized non-elastomer such as styrene wherein the blocks have narrow molecular weight distributions. Anionic polymerization of such block copolymers is well known in the art and a number are commercial, being marketed by Shell Chemical Company as KRATON ® Thermoplastic Rubber.

Cationic polymerization of elastomeric polymers is described in U.S. Pat. No. 4,946,899. A cationic polymerization initiator of desired functionality is reacted with one or more monomers in the presence of a complex of a Lewis acid such as titanium tetrachloride or boron trichloride and an electron pair donor (Lewis base) such as ethyl acetate, dimethyl acetamide, dimethyl formamide, dimethyl sulfoxide, hexamethyl phosphoric triamide, N-methyl-2-pyrrolidinone, pyridine, acetone, methylethyl ketone, etc. Elastomeric polymers of isobutylene, including block copolymers with styrene or styrene derivatives, were found to have narrower molecular weight distributions than previously achieved by cationic processes. However, the molecular weight distributions are significantly broader than is achieved b anionic polymerization.

Further narrowing of the molecular weight distributions achieved by cationic polymerization is essential to prepare elastomeric polymers having comparable properties to polymers produced by anionic polymerization.

SUMMARY OF THE INVENTION

The present invention is a cationic polymerization process that provides elastomeric polymers that have mono-modal, narrow molecular weight distributions such as achieved by anionic polymerization. The polymerization process involves the combination of (1) selecting pyridine or a non-hindered alkylpyridine as an electron pair donor with titanium tetrachloride as a Lewis acid and (2) stopping the polymerization of each monomer prior to broadening of the molecular weight distribution. Polydispersity indexes ($\overline{Mw}/\overline{Mn}$) less than 1.1 for homopolymers of isobutylene and less than 1.2 for block copolymers of isobutylene and styrene have been achieved with the cationic polymerization process.

DESCRIPTION OF THE INVENTION

The process of the invention is a modification of the cationic polymerization process described in U.S. Pat. No. 4,946,899 which description is incorporated by reference herein. Variations from the '899 description are explained in detail below.

The Lewis acid used to promote cationic polymerization is titanium tetrachloride. The selected electron pair donors significantly contribute to narrower molecular weight distributions and are generally described as pyridine or a non-hindered alkylpyridine. The electron pair donors have the following aromatic structure:

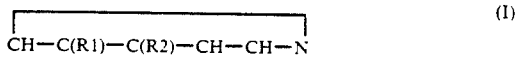
(I)

wherein R1 and R2 are independently hydrogen, methyl, ethyl, propyl, or butyl groups. The preferred electron pair donors have hydrogen, methyl, or ethyl groups and include:
Pyridine
3-Methylpyridine (Beta-Picoline)
4-Methylpyridine (Gamma-Picoline)
3-Ethylpyridine (Beta-Lutidine)
4-Ethylpyridine
3,4-Dimethylpyridine (Beta,Gamma-Lutidine)
4-Methyl-3-ethylpyridine (Beta-Collidine)
3,4-Diethylpyridine (Beta-Parvoline)
Pyridine has worked well as shown by the examples below.

The electron pair donors serve a different function than the hindered pyridines used in small amounts as proton traps. The use of a small amount of a hindered pyridine, preferably 2,6-di-t-butylpyridine, as described in U.S. Pat. No. 4,946,899 is also preferred here.

The molar ratio of electron pair donor to titanium tetrachloride is preferably from 1:2 to ?:1?, most preferably from 1:4 to 1:4, which provides a sufficient polymerization time to terminate polymerization of each monomer prior to broadening of the molecular weight distribution. The molecular weight distribution of the growing polymers appears very narrow until the supply of monomer is substantially depleted. Termination of each polymerization step at or before depletion of the monomer precludes significant broadening of the molecular weight distributions which substantially detracts from polymer properties.

Termination of each polymerization step at 60%–90% theoretical conversion of the monomer has consistently precluded formation of both low and high molecular weight components as determined by visual inspection of GPC data. For block copolymers, the monomers are polymerized in the order of increasing reactivity so that addition of the next more reactive monomer essentially stops polymerization of previous monomers at a level of conversion that prevents formation of the low molecular weight components. Polymerization of the last or only monomer is terminated at the appropriate time with a very active terminating agent.

The surprisingly narrow molecular weight distributions achieved in polymers made by this method are readily obtained at the expense of lower monomer conversions. Both high monomer conversions and narrow molecular weight distributions have been achieved by stopping polymerization very near the point of monomer depletion. However, the point of monomer depletion is generally not known with sufficient precision to risk further reaction in the absence of the monomer.

The process of the invention makes both homopolymers and block copolymers as exemplified by the following structures:

(1)

(2)

wherein each A is a block of polymerized alkenyl aromatic compound, each B is a block of polymerized alpha olefin or conjugated alkadiene, n is an integer from 1 to 3, and X is the residue of a polymerization initiator having n functional sites.

Each B block in the structures of Formula 1 and 2 is a block of at least predominantly polymerized alpha olefin or conjugated alkadiene as described in U.S. Pat. No. 4,946,899 which description is incorporated by reference herein. The most preferred monomer for the B block is isobutylene. Two or more monomers may be combined in the B block as desired.

The alkenyl aromatic compounds employed as each A block in Formula 2 are hydrocarbon compounds of up to 18 carbon atoms having an alkenyl group of up to 6 carbon atoms attached to a ring carbon atom of an aromatic ring system of up to 2 aromatic rings. Such alkenyl aromatic compounds are illustrated by styrene (vinylbenzene), 2-butenylnaphthalene, 3-isopropylbiphenyl, isopropenylnaphthalene, and indene. The preferred alkenyl aromatic compounds have an alkenyl group of up to 3 carbon atoms attached to a benzene ring as exemplified by styrene and styrene homologs such as styrene, α-methylstyrene, p-methylstyrene, α,4-dimethylstyrene, and p-methoxystyrene. Styrene and α-methylstyrene are particularly preferred alkenyl aromatic compounds, especially styrene.

The preferred processes for producing the block polymers of Formula 1 and 2 are rather particular because of the requirement for stopping polymerization of each monomer prior to significant broadening of the molecular weight distribution. In the production of the block copolymers of the invention, the less reactive B blocks are polymerized first and then the more active A blocks are polymerized prior to termination of the reaction.

In each procedure to form a polymer of Formula 1 or 2, polymerization initiators having from 1 to 3 reactive sites are selected depending on the desired polymer structure. The monomers are cationically polymerized in the presence of from 0.00025 to 0.06 moles of reactive sites on the polymerization initiator per mole of monomer depending on the desired molecular weights. The molar ratio of reactive sites on the initiators to the electron donor is preferably 1:1. The polymerization is terminated by reaction with a protic material, typically an alkanol such as methanol or ethanol. The polymers are then recovered by well known procedures such as precipitation or solvent removal.

Suitable monofunctional initiators are 2-chloro-2-phenylpropane or 2-chloro-2,4,4-trimethylpentane. The polymers of the invention are preferably produced with difunctional or multifunctional initiators as described in U.S. Pat. No. 4,946,899 which description is incorporated by reference herein. In this modification, the central B block is produced first by polymerizing the alpha olefin or conjugated alkadiene in the presence of the multifunctional initiator, e.g., 1,3-di(1-chloro-1-methylethyl)-5-t-butylbenzene (a blocked dicumyl chloride) or 1,3,5-tri(1-chloro-1-methylethyl)benzene (tricumyl chloride), to produce a B block with two or three arms. Each arm extends from the residue of the polymerization initiator and has a living reactive site. The blocked dicumyl chloride is preferred for making di-arm, linear polymers since a non-blocked initiator leaves open the possibility for undesirable aromatic ring alkylation after the monomer addition.

This polymeric species is then terminated to make a homopolymer (Formula 1) or reacted with a more active monomer to make a block copolymer (Formula 2).

Each arm in the B block has a number average molecular weight from 1,000 to 250,000, preferably from 1,000 to 100,000. Each A block has a number average molecular weight from 2,000 to 50,000, preferably from 2,000 to 20,000. The homopolymers of the invention (Formula 1) further have molecular weight distributions represented by a polydispersity index less than 1.2, preferably less than 1.1. The block copolymers of the invention (Formula 2) have molecular weight distributions represented by a polydispersity index less than 1.3, preferably less than 1.2. Both number average and weight average molecular weights for determining the molecular weight distribution are measured by gel permeation chromatography (GPC).

The polymers of the invention, like the known cationically polymerized polymers and the conventional anionically polymerized polymers, are elastomers and have utilities conventional for elastomers. However, the polymers of the invention demonstrate significantly narrower molecular weight distributions in comparison to known cationic polymerization processes which improves polymer properties to the extent provided by anionic polymerization.

EXAMPLES

The following examples demonstrate the cationic polymerization of homopolymers and block copolymers having very narrow molecular weight distributions as evidenced by low polydispersity indexes. The narrow distributions result from selection of pyridine as the electron donor and termination of each polymerization step prior to broadening of the distributions.

Instrumentation. Molecular weights were determined by gel permeation chromatography (GPC) using an instrument composed of a Waters high-pressure 6000A pump, four Waters ultra-styragel columns of pore sizes $10^5$, $10^4$, $10^3$, $10^2$, A, and a Waters differential refractometer, model 410. A polyisobutylene calibration curve was constructed using standards obtained from American Polymer Standards Corp.

EXAMPLE 1

Cationic Polymerization of Polyisobutylenes

Near-monodisperse di-arm linear and tri-arm radial polyisobutylene homopolymers were prepared under a dry nitrogen atmosphere in a glove box equipped with an integral cold temperature bath as follows:

Into a 2000 ml three-neck, round-bottomed flask equipped with mechanical stirrer were charged 1.714 g (0.0056 mole) tricumyl chloride (TCC), 1.328 g (0.0168 mole) pyridine, and 600 ml hexanes. The flask was immersed into the cold-temperature bath (−50° C.), and first 400 ml of methyl chloride and then 83 ml of isobutylene (1 mole) were condensed into a chilled graduated cylinder and transferred into the flask. With vigorous stirring, 31.872 g of TiCl$_4$ (0.168 mole) was rapidly injected into the flask to commence polymerization. Before addition of the TiCl$_4$, the mixture was completely homogenous; upon TiCl$_4$ addition, an immediate precipitation was observed, believed to be a complex of pyridine with TiCl$_4$ (stoichiometry unknown), and this precipitate persisted throughout the reaction. As far as could be observed, the product polyisobutylene was completely soluble in the cosolvents system (hexanes/- methyl chloride). The polymerization was terminated by injection of an excess amount (50 ml) of prechilled methanol. The reactor was removed from the glove box, placed in a fume hood, and allowed to warm to room temperature with stirring to insure smooth evaporation of MeCl. Additional hexanes (400 ml) were added to the solution, which was then washed with 5 wt % aqueous HCl solution three times, washed with deionized water three times, and dried over MgSO$_4$. The polymer was isolated by evaporating the hexanes.

Specific polymerization conditions and recorded data for the synthesis of di-arm linear and tri-arm radial polyisobutylenes are listed in Tables 1, 2, and 3 for polymerizations at −30°, −50, and −80° C., respectively. In all cases, 1 molar isobutylene was used and the molar concentrations of all components are listed in the tables. Near-monodisperse polyisobutylene (polydispersity index <1.2) with various number average molecular weights were obtained depending on the reaction conditions employed and the time allowed for reaction. Using the TiCl$_4$/pyridine initiating system, I$_{eff}$ was consistently greater than 90% regardless of the reaction temperature and the monomer conversion. This suggests that the rate of propagation is significantly slower than the rate of initiation, as desired for a living polymerization.

GPC analysis for molecular weight distributions confirmed that the process consistently results in polydispersity indexes less than 1.2 with some samples having indexes less than 1.1. Samples containing low molecular weight components were obtained by allowing longer reaction times sufficient to deplete the available monomer. The low molecular weight component was observed on the GPC chromatogram as a low molecular weight tail appearing on the high-elution-volume side of the main polymer peak. The peaks remained monomodal. The phenomenon was observed even at −80° C. Thus, rate of propagation and time of reaction, are very important parameters in controlling living cationic polymerization unlike living anionic polymerizations. Close attention must be given to the time of reaction for each temperature and initiator concentration.

TABLE 1

Polymerization of Isobutylene Using TiCl$_4$/pyridine at −30° C.

| M$_n$ Stoich. | Molar Concentration [TCC] × 10$^{-3}$ | [IB] | Total reaction vol. (ml) | M$_n$ Obtained | PDI | Theor. Conv. (%) | I$_{eff}$ (%) | Rxn time (min) |
|---|---|---|---|---|---|---|---|---|
| 5,000 | 11.4 | 1.03 | 350 | 5,400 | 1.18 | 100 | 93 | 30 |
| 10,000 | 5.8 | 1.03 | 350 | 7,200 | 1.07 | 60 | 83.3 | 30 |
| 20,000 | 3.13 | 1.11 | 800 | 6,800 | 1.10 | 32.3 | 95 | 30 |

M$_n$ stoich. = weight of Isobutylene (IB)/mole of TCC
[pyridine] = 3 × [TCC]
[TiCl$_4$] = 5 × [pyridine]
solvent = hexanes/MeCl (60/40, v/v)
M$_n$ and Polydispersity Index (PDI) were calculated from GPC data.

TABLE 2

Polymerization of Isobutylene Using TiCl$_4$/pyridine at −50° C.

| M$_n$ Stoich. | Molar Concentration [TCC] × 10$^{-3}$ | IB | Total reaction vol. (ml) | M$_n$ Obtained | PDI | Theor. Conv. (%) | I$_{eff}$ (%) | Rxn time (min) |
|---|---|---|---|---|---|---|---|---|
| 30,000 | 1.96 | 1.05 | 1,700 | 23,300 | 1.11 | 78 | 101 | 150 |
| 25,000 | 2.35 | 1.05 | 170 | 14,700 | 1.08 | 56 | 95 | 15 |
| 25,000 | 2.35 | 1.05 | 1,700 | 20,400 | 1.13 | 80 | 102 | 150 |
| 25,000 | 2.23 | 1.00 | 35 | 20,200 | 1.13 | 79 | 98 | 180 |
| 15,000 | 3.92 | 1.05 | 1,700 | 7,100 | 1.06 | 50 | 106 | 30 |
| 15,000 | 3.92 | 1.05 | 1,700 | 11,500 | 1.06 | 71 | 93 | 45 |
| 15,000 | 3.92 | 1.05 | 1,700 | 14,100 | 1.04 | 99 | 105 | 60 |
| 10,800 | 5.88 | 1.13 | 1,700 | 11,800 | 1.05 | 104 | 95 | 40 |

M$_n$ stoich. = weight of Isobutylene (IB)/mole of TCC
[pyridine] = 3 × [TCC]
[TiCl$_4$] = 5 × [pyridine]
solvent = hexanes/MeCl (60/40, v/v)
M$_n$ and Polydispersity Index (PDI) were calculated from GPC data.

TABLE 3

Polymerization of Isobutylene Using TiCl$_4$/pyridine at −80° C.

| M$_n$ Stoich. | [B-DCC] × 10$^{-3}$ | IB | Total reaction vol. (ml) | M$_n$ Obtained | PDI | Theor. Conv. (%) | I$_{eff}$ (%) | Rxn time (min) |
|---|---|---|---|---|---|---|---|---|
| 18,000 | 3.92 | 1.26 | 1,700 | 19,300 | 1.06 | 104 | 93 | 40 |
| 15,000 | 3.92 | 1.05 | 1,700 | 16,200 | 1.07 | 105 | 97 | 30 |
| 13,600 | 4.32 | 1.05 | 1,700 | 11,400 | 1.10 | 87 | 104 | 15 |
| 9,400 | 6.26 | 1.05 | 1,700 | 10,300 | 1.07 | 102 | 94 | 15 |
| 4,400 | 13.37 | 1.05 | 1,700 | 5,100 | 1.15 | 118 | 103 | 15 |
| | [TCC] × 10$^{-3}$ | | | | | | | |
| 100,000 | 0.67 | 1.20 | 2,500 | 94,600 | 1.10 | 96 | 101 | 390* |
| 50,000 | 1.34 | 1.20 | 2,500 | 49,500 | 1.09 | 96 | 97 | 180* |

TABLE 3-continued

Polymerization of Isobutylene Using TiCl$_4$/pyridine at $-80°$ C.

| $M_n$ Stoich. | IB | Total reaction vol. (ml) | $M_n$ Obtained | PDI | Theor. Conv. (%) | $I_{eff}$ (%) | Rxn time (min) |
|---|---|---|---|---|---|---|---|
| 27,000 | 1.73 | 0.83 | 1,500 | 24,600 | 1.12 | 95 | 105 | 40 |
| 20,000 | 2.80 | 1.00 | 300 | 20,300 | 1.04 | 106 | 104 | 60 |

$M_n$ stoich. = weight of Isobutylene (IB)/mole of B-DCC (t-Bu-m-DCC) or TCC
[pyridine] = 2 × [B-DCC] or 3 × [TCC]
[TiCl$_4$] = 5 × [pyridine]
solvent = hexanes/MeCl (60/40, v/v)
$M_n$ and Polydispersity Index (PDI) were calculated from GPC data.
*incremental monomer addition without intermediate depletion of monomer.

Example 2

Block Copolymers of Isobutylene and Styrene

The synthesis of di-arm linear and tri-arm radial polystyrene-polyisobutylene block copolymers of the invention was accomplished as described below. The reagents used to synthesize these block copolymers are listed in Table 4 along with their corresponding concentrations. The difunctional initiator 1,3-di(2-chloro-2-propyl)5-tert-butyl benzene (m-tBuDCC) was used to produce the linear block copolymer, while the trifunctional initiator 1,3,5-tri(2-chloro-2-propyl)benzene (TCC) was used to produce the three-arm radial block copolymer. Methylcyclohexane was used as the nonpolar solvent component to enhance solubility of polystyrene blocks.

Polymerizations were carried out at $-80°$ C. in a glove box under a dry nitrogen atmosphere using dry 2000 ml three-necked, round bottom flasks equipped with mechanical stirrers. The first step of the block copolymer synthesis was the living cationic polymerization of isobutylene to about 90% theoretical monomer conversion. This was accomplished by adding pre-chilled TiCl$_4$ to a methylcyclohexane/methyl chloride (60/40 by volume) solution of isobutylene, pyridine, 2,6-ditertbutylpyridine, and the appropriate initiator and allowing the reaction mixture to polymerize for approximately one hour. The second step of the polymerization was the formation of polystyrene blocks by the addition of neat styrene to the living polyisobutylene chains formed in the first step and allowing polymerization to continue for approximately one additional hour at which time it was stopped by the addition of 30 mls of pre-chilled methanol.

The final polystyrene-polyisobutylene-polystyrene linear block copolymer was estimated to have block molecular weights (Mn) of 4,000–24,600–4,000. Similarly, the radial block copolymer has a central three-arm polyisobutylene block of 37,500 and three terminal styrene blocks of 4,200.

Throughout the course of the block copolymerization, small aliquots of the polymerization mixture were removed and quenched with methanol so that the molecular weight of growing polymer chains could be monitored as a function of reaction time. Molecular weight and molecular weight distribution data thus obtained for the linear block copolymer sample are given in Table 5. Once quenched, the reaction mixture was allowed to warm to room temperature, causing the methyl chloride to volatilize, and washed three times with a 5% aqueous HCl solution, three times with distilled water, and then precipitate into 3000 mls of rapidly stirring methanol. The polymer, once isolated, was dissolved in toluene and dried over magnesium sulfate and reprecipitated into methanol.

The data in Table 5 demonstrates a slight broadening of the molecular weight distribution between 76 minutes and 116 minutes from a preferred polydispersity index less than 1.2 to an index less than 1.3. GPC data for the respective samples suggests appearance of a high molecular weight component sometime after 76 minutes of reaction. The high molecular weight component was tentatively identified as 1.7% by polymer weight of homopolystyrene by selective solvent extraction using methyl ethyl ketone in a soxhlet extractor.

TABLE 4

Polymerization Conditions for Linear and Three-arm Radial Block Copolymers

| Linear (PS—PIB—)$_2$X | Three-Arm Radial (PS—PIB)$_3$-X |
|---|---|
| [t-Bu DCC] = 0.0026 mole | [TCC] = 0.0017 mole |
| [pyridine] = 0.0052 mole | [pyridine] = 0.0052 mole |
| [DtBP] = 0.0073 mole | [DtBP] = 0.0073 mole |
| [TiCl$_4$] = 0.0560 mole | [TiCl$_4$] = 0.0560 mole |
| [isobutylene] = 1.2500 mole | [isobutylene] = 1.2500 mole |
| [styrene] = 0.2700 mole | [styrene] = 0.2700 mole |
| IB rxn time = 54 min. | IB rxn time = 65 min. |
| Styrene rxn time = 62 min. | Styrene rxn time = 73 min. |

Solvent = 600 ml of CH$_3$Cl + 900 ml of Methylcyclohexane
Temperature = $-80°$ C.

TABLE 5

Incremental Growth of a Linear Block Copolymer Using TiCl$_4$/pyridine

| Time (min) | Mn | PDI | Remarks |
|---|---|---|---|
| 11 | 18,200 | 1.13 | |
| 31 | 24,000 | 1.10 | |
| 52 | 25,000 | 1.13 | Just prior to styrene addition. |
| 76 | 33,000 | 1.15 | 22 min. after styrene addition. |
| 116 | 34,900 | 1.23 | Visual appearance of high mol. wt. component on GPC run. |

Mn and Polydispersity Index (PDI) were calculated from GPC data.

What is claimed is:

1. A process for making an elastomeric polymer comprising an alpha-olefin or a conjugated alkadiene, comprising the steps of:
   cationically polymerizing an alpha-olefin monomer or a conjugated diene monomer in the presence of titanium tetrachloride and an electron pair donor selected from the group consisting of pyridine and non-hindered alkylpyridines to form living polymer molecules; and
   stopping polymerization of the monomer while the polydispersity index of the living polymer molecules is less than 1.2.

2. The process of claim 1, wherein the polymerization of the monomer is stopped by addition of an alkenyl aromatic monomer.

3. The process of claim 2, further comprising the steps of:
cationically polymerizing blocks of the alkenyl aromatic monomer onto the living polymer molecules in the presence of the titanium tetrachloride and the electron pair donor; and
stopping polymerization of the alkenyl aromatic monomer while the polydispersity index of the living polymer molecules is less than 1.3.

4. The process of claim 3, wherein the electron pair donor has the aromatic structure:

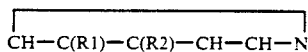
(I)

wherein R1 and R2 are independently hydrogen, methyl, ethyl, propyl, or butyl groups.

5. The process of claim 4, wherein the electron pair donor is pyridine.

6. The process of claim 5, wherein each polymerization step is stopped at 60%-90% conversion of the monomer.

7. A process for making a block copolymer comprising a block of an alpha-olefin or a conjugated alkadiene and a block of an alkenyl aromatic compound, comprising the steps of:
cationically polymerizing an alpha-olefin monomer or a conjugated diene monomer in the presence of titanium tetrachloride and pyridine to form living polymer molecules;
stopping polymerization of the monomer while the polydispersity index of the living polymer molecules is less than 1.2 by addition of an alkenyl aromatic monomer;
cationically polymerizing blocks of the alkenyl aromatic monomer onto the living polymer molecules in the presence of the titanium tetrachloride and the electron pair donor; and
stopping polymerization of the alkenyl aromatic monomer while the polydispersity index of the living polymer molecules is less than 1.3.

8. The process of claim 7, wherein an alpha-olefin is polymerized to prepare the living polymer molecules and styrene is added to stop polymerization of the alpha-olefin and polymerize the styrene onto the living polymer molecules.

9. The process of claim 8, wherein the alpha-olefin is isobutylene.

10. The process of claim 9, wherein the cationic polymerization of the styrene is stopped while the living polymer molecules have a polydispersity index less than 1.2.

11. The process of claim 10, wherein cationic polymerization of the isobutylene is stopped while the living polymer molecules have a polydispersity index less than 1.1.

12. The process of claim 11, wherein each polymerization step is stopped at 60%-90% conversion of the monomer.

13. The process of claim 12, wherein the cationic polymerization is initiated with a difunctional initiator.

14. The process of claim 13, wherein each block of the isobutylene has a number average molecular weight from 2,000 to 200,000, and each block of the styrene has a number average molecular weight from 2,000 to 20,000.

15. An elastomeric polymer produced by the process of:
cationically polymerizing an alpha-olefin or a conjugated diene monomer in the presence of titanium tetrachloride and an electron pair donor selected from the group consisting of pyridine and non-hindered alkylpyridines to form living polymer molecules;
stopping polymerization of the monomer while the polydispersity index of the living polymer molecules is less than 1.2 by addition of an alkenyl aromatic monomer;
cationically polymerizing the alkenyl aromatic monomer onto the living polymer molecules in the presence of the titanium tetrachloride and the electron pair donor; and
stopping polymerization of the alkenyl aromatic monomer while the polydispersity index of the living polymer molecules is less than 1.3.

16. The elastomeric polymer of claim 15, wherein the electron pair donor is pyridine.

17. The elastomeric polymer of claim 16, wherein the polymer consists of the block structure styrene-isobutylene-styrene.

18. The elastomeric polymer of claim 17, wherein:
each block of the isobutylene has a number average molecular weight from 2,000 to 200,000;
each block of the styrene has a number average molecular weight from 2,000 to 25,000; and
the polymer has a polydispersity index less than 1.2.

* * * * *